United States Patent
Wu

(10) Patent No.: US 11,894,930 B1
(45) Date of Patent: Feb. 6, 2024

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/478,603

(22) Filed: Sep. 29, 2023

Related U.S. Application Data

(63) Continuation of application No. PCT/CN2021/085471, filed on Apr. 2, 2021.

(51) Int. Cl.
*H04W 72/12* (2023.01)
*H04W 72/232* (2023.01)
*H04W 56/00* (2009.01)
*H04L 1/1812* (2023.01)

(52) U.S. Cl.
CPC ....... *H04L 1/1812* (2013.01); *H04W 56/0045* (2013.01); *H04W 72/12* (2013.01); *H04W 72/232* (2023.01)

(58) Field of Classification Search
CPC .................................................. H04W 72/12
USPC ........................................................ 370/329
See application file for complete search history.

(56) References Cited

FOREIGN PATENT DOCUMENTS

| | | |
|---|---|---|
| CN | 109802772 | 5/2019 |
| CN | 111034340 | 4/2020 |
| CN | 111800868 | 10/2020 |
| CN | 111865506 | 10/2020 |
| CN | 112217619 | 1/2021 |

OTHER PUBLICATIONS

Ericsson, "On scheduling, HARQ, and DRX for NT," 3GPP TSG-RAN WG2 #112, R2-2010168 (Revision of R2-2007714), Nov. 2020.
ZTE, "Discussion on time relationship for IoT-NTN," 3GPP TSG RAN WG1 #104e, R1-2100250, Jan. 2021.
Nokia et al., "Timing Advance, Random Access and DRX aspects in NTN," 3GPP TSG-RAN WG2 Meeting #111 Electronic, R2-2007590, Aug. 2020.
WIPO, International Search Report and Written Opinion for PCT/CN2021/085471, dated Dec. 29, 2021.
"3rd Generation Partnership Project; Technical Specification Group Services and System Aspects; Vocabulary for 3GPP Specifications (Release 16)," 3GPP TR 21.905, Jun. 2019, v16.0.0.

*Primary Examiner* — Angel T Brockman
(74) *Attorney, Agent, or Firm* — Hodgson Russ LLP

(57) ABSTRACT

A wireless communication method includes: monitoring a control channel candidate on the basis of at least one of a first offset value, a second offset value, and a hybrid automatic repeat request-acknowledgment (HARQ-ACK) feedback state, wherein a time interval corresponding to the first offset value is associated with a timing advance (TA) value or round-trip time (RTT) of a terminal device, and a time interval corresponding to the second offset value is associated with acquisition of synchronization information of the terminal device.

20 Claims, 7 Drawing Sheets

200

Monitor a control channel candidate on the basis of at least one of a first offset value, a second offset value, and a hybrid automatic repeat request-acknowledgment (HARQ-ACK) feedback state, wherein a time interval corresponding to the first offset value is associated with a timing advance (TA) value or a round-trip time (RTT) of the terminal device, and a time interval corresponding to the second offset value is associated with acquisition of synchronization information of the terminal device

S210

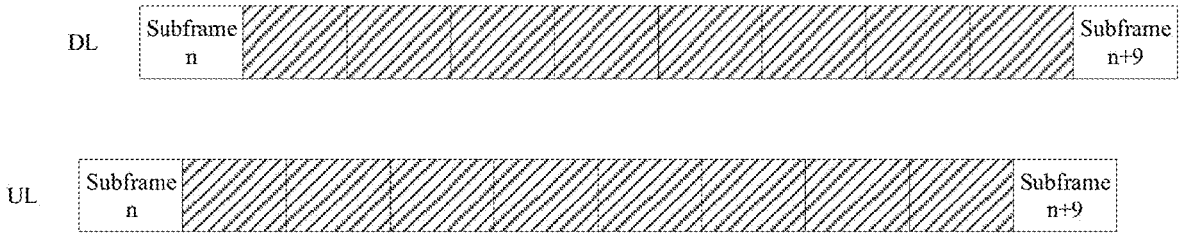

FIG. 8

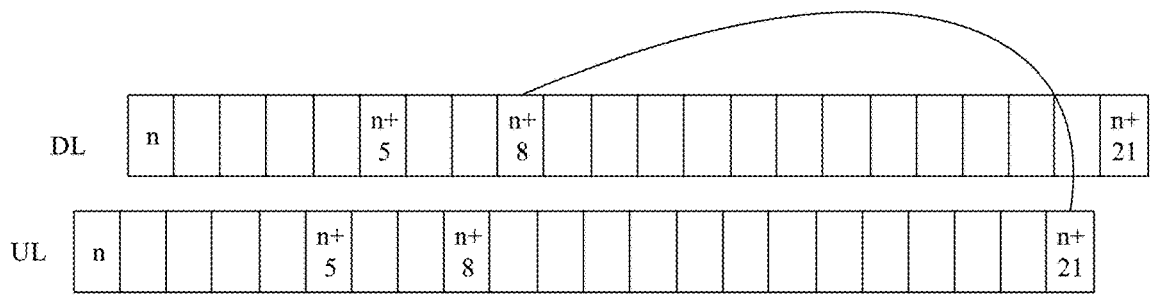

FIG. 9

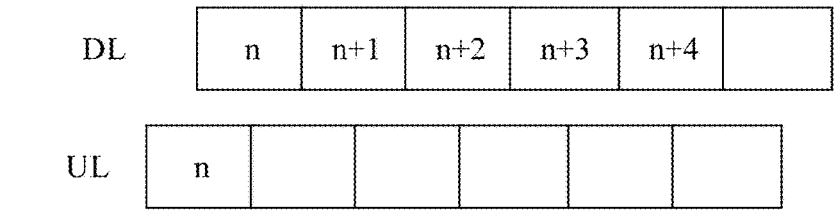

Monitor a control channel candidate on the basis of at least one of a first offset value, a second offset value, and a hybrid automatic repeat request-acknowledgment (HARQ-ACK) feedback state, wherein a time interval corresponding to the first offset value is associated with a timing advance (TA) value or a round-trip time (RTT) of the terminal device, and a time interval corresponding to the second offset value is associated with acquisition of synchronization information of the terminal device — S210

FIG. 11

WIRELESS COMMUNICATION METHOD AND TERMINAL DEVICE

CROSS-REFERENCE TO RELATED APPLICATION

This application is a continuation of International Application No. PCT/CN2021/085471, filed Apr. 2, 2021, the entire disclosure which is incorporated herein by reference.

TECHNICAL FIELD

Embodiments of this application relate to the field of communication, and more particularly, to a wireless communication method and a terminal device.

BACKGROUND

In the new radio (NR) system, non-terrestrial communication networks (NTN) are considered to provide communication services to users. However, due to the large propagation delay in the NTN system, the range of TA value is also relatively large. Correspondingly, the uplink and downlink timing relationship in the Internet of Things NTN (IoT-NTN) system, compared to that in the terrestrial networks (TN) system, may need to be enhanced. For example, the detection of the control channel in the IoT-NTN system may also need to be enhanced.

SUMMARY

This application provides a wireless communication method and a terminal device, which can ensure, by improving the scheduling timing, the normal operation of the terminal device that does not have the capability of simultaneously receiving and transmitting signals, while achieving the effect of power saving.

In a first aspect, this application provides a wireless communication method, including:
monitoring a control channel candidate based on at least one of a first offset value, a second offset value, or a hybrid automatic repeat request acknowledgement (HARQ-ACK) feedback state, where a time interval corresponding to the first offset value is associated with a timing advance (TA) value or a round-trip time (RTT) of a terminal device, and a time interval corresponding to the second offset value is associated with synchronization information acquisition of the terminal device.

In a second aspect, this application provides a terminal device for implementing the method in the first aspect or any embodiment thereof. Specifically, the terminal device includes a functional module for implementing the method in the first aspect or any embodiment thereof.

In some embodiments, the terminal device may include a processing unit for performing functions related to information processing. For example, the processing unit may be a processor.

In some embodiments, the terminal device may include a sending unit and/or a receiving unit. The sending unit is configured to perform functions related to transmission, and the receiving unit is configured to perform functions related to reception. For example, the sending unit may be a transmitting device or a transmitter, and the receiving unit may be a receiving device or a receiver. For another example, the terminal device is a communication chip, the sending unit may be an input circuit or interface of the communication chip, and the sending unit may be an output circuit or interface of the communication chip.

In a third aspect, this application provides a terminal device including a processor and a memory. The memory is configured to store a computer program, and the processor is configured to call and run the computer program stored in the memory, so as to implement the method in the forgoing first aspect or any embodiment thereof.

In some embodiments, the processor includes one or more processors and the memory includes one or more memories.

In some embodiments, the memory may be integrated with the processor, or the memory may be provided separately from the processor.

In some embodiments, the terminal device further includes a transmitter (transmitting device) and a receiver (receiving device).

In a fourth aspect, this application provides a chip for implementing the method in the forgoing first aspect or any embodiment thereof. Specifically, the chip includes a processor configured to invoke and execute a computer program from a memory, thereby causing a device on which the chip is installed to implement the method in the first aspect or any embodiment thereof.

In a fifth aspect, this application provides a computer-readable storage medium for storing a computer program, where the computer program causes a computer to implement the method in the first aspect or any embodiment thereof.

In a sixth aspect, this application provides a computer program product which includes computer program instructions, where the computer program instructions cause a computer to implement the method in the first aspect or any embodiment thereof.

In a seventh aspect, this application provides a computer program, which, when run on a computer, causes the computer to implement the method in the forgoing first aspect or any embodiment thereof.

Based on the above solution, the control channel candidate is monitored based on at least one of the first offset value, the second offset value and the HARQ-ACK feedback state, thereby improving the scheduling timing and, additionally, ensuring the normal operation of a terminal device that does not have the ability to receive and transmit signals at the same time while achieving the effect of power saving.

BRIEF DESCRIPTION OF THE DRAWINGS

FIG. 8 to FIG. 10 are schematic diagrams of a subframe(s) in which the terminal device does not detect NPDCCH according to some embodiments of this application.

FIG. 11 is a schematic flowchart of a wireless communication method according to some embodiments of this application.

DETAILED DESCRIPTION

The technical solutions in some embodiments of this application will be described below with reference to the accompanying drawings.

Figure 1:
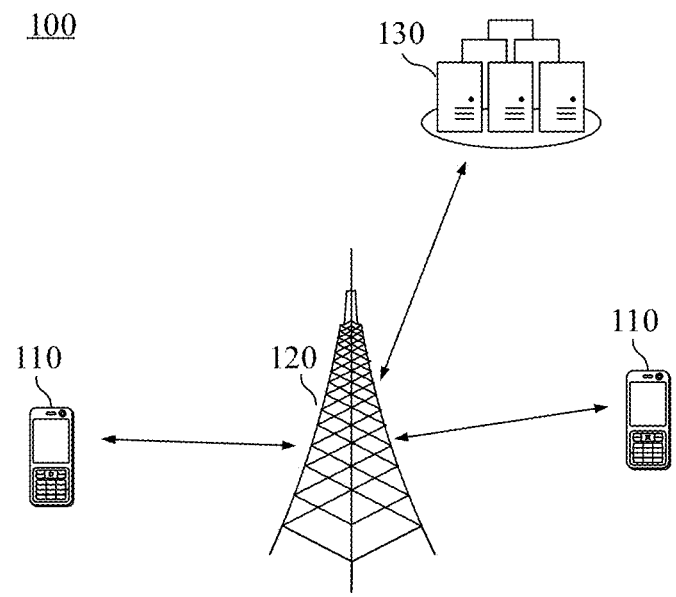
FIG. 1 to FIG. 3 are schematic block diagrams of a system framework according to some embodiments of this application.

FIG. 1 is a schematic diagram of an application scenario according to some embodiments of this application.

As shown in FIG. 1, the communication system 100 may include a terminal device 110 and a network device 120. The network device 120 may communicate with the terminal device 110 through an air interface. Multi-service transmission is supported between the terminal device 110 and the network device 120.

It should be understood that some embodiments of this application only use the communication system 100 for exemplary description, but embodiments of this application are not limited thereto. In other words, the technical solutions according to some embodiments of this application can be applied to various communication systems, for example, Long Term Evolution (LTE) system, LTE Time Division Duplex (TDD), Universal Mobile Telecommunication System (UMTS), Internet of Things (IoT) system, Narrow Band Internet of Things (NB-IoT) system, enhanced Machine-Type Communications (eMTC) system, 5G communication system (also known as New Radio, NR, communication system), future communication system, or the like.

In the communication system 100 shown in FIG. 1, the network device 120 may be an access network device that communicates with the terminal device 110. The access network device may provide communication coverage for a particular geographic area, and may communicate with terminal devices 110 (e.g., UEs) located within the coverage area.

The network device 120 may be an Evolutional Node B (eNB or eNodeB) in the LTE system, or a Next Generation Radio Access Network (NG RAN) device, or a gNB in the NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in the future evolved Public Land Mobile Network (PLMN).

The terminal device 110 may be any terminal device, which includes, but is not limited to, a terminal device that adopts a wired or wireless connection with the network device 120 or other terminal devices.

For example, the terminal device 110 may refer to an access terminal, a user equipment (UE), a subscriber unit, a subscriber station, a mobile station, a mobile site, a remote station, a remote terminal, a mobile device, a user terminal, a terminal, a wireless communication device, a user agent, or a user device. The access terminal may be a cellular phone, a cordless phone, a Session Initiation Protocol (SIP) phone, an IoT device, a satellite handset, a Wireless Local Loop (WLL) station, a Personal Digital Assistant (PDA), a handheld device with wireless communication functions, a computing device or another processing device connected to wireless modems, an in-vehicle device, a wearable device, a terminal device in 5G networks, a terminal device in future evolved networks, or the like.

The terminal device 110 may be used for Device to Device (D2D) communication.

The wireless communication system 100 may further include a core network device 130 that communicates with the base station, and the core network device 130 may be a 5G core network (5G Core, 5GC) device, for example, an Access and Mobility Management Function (AMF); for another example, an Authentication Server Function (AUSF); for yet another example, a User Plane Function (UPF); for still another example, a Session Management Function (SMF). Optionally, the core network device 130 may also be an Evolved Packet Core (EPC) device of the LTE network, for example, a Session Management Function+Core Packet Gateway (SMF+PGW-C) device. It should be understood that the SMF+PGW-C can simultaneously implement the functions that the SMF and the PGW-C can implement. In the process of network evolution, the forgoing core network devices may also be called as other names. Alternatively, a new network entity may be formed by dividing the functions of the core network, which is not limited in embodiments of this application.

The various functional units in the communication system 100 may also establish a connection through a next generation network (next generation, NG) interface to implement communication.

For example, the terminal device establishes an air interface connection with the access network device through an NR interface to transmit user plane data and control plane signaling. The terminal device may establish a control plane signaling connection with the AMF through an NG interface 1 (N1 for short). The access network device, such as a next generation wireless access base station (gNB), may establish a user plane data connection with the UPF through an NG interface 3 (N3 for short). The access network device may establish a control plane signaling connection with the AMF through an NG interface 2 (N2 for short). The UPF may establish a control plane signaling connection with the SMF through an NG interface 4 (N4 for short). The UPF may exchange user plane data with the data network through an NG interface 6 (N6 for short). The AMF may communicate with the SMF through an NG interface 11 (N11 for short), The SMF may establish a control plane signaling connection with the PCF through an NG interface 7 (N7 for short).

FIG. 1 exemplarily shows one base station, one core network device and two terminal devices. Optionally, the wireless communication system 100 may include multiple base station devices and the coverage area of each base station may include other numbers of terminal devices, which is not limited in embodiments of this application.

3GPP is discussing Non Terrestrial Network (NTN) technology. NTN generally uses satellite communication to provide communication services to terrestrial users. Compared with terrestrial cellular network communication, satellite communication has many unique advantages. First of all, satellite communication is not limited by the user's geographical area. For example, general terrestrial communication cannot cover areas such as oceans, mountains, deserts, and the like, where communication devices cannot be installed or areas that are not to be covered due to sparse population. For satellite communication, due to a single satellite can cover a large area, and the satellite can orbit around the earth, so theoretically every corner of the earth can be covered by satellite communication. Secondly, satellite communication has great social value. Satellite communication can be covered at low cost in remote mountainous areas and poor and backward countries or regions, so that people in these areas/regions can enjoy advanced voice communication and mobile Internet technologies, which is conducive to narrowing the digital divide with developed regions and promoting development in these areas/regions. Thirdly, satellite communication is long-distance, and the communication cost does not increase significantly when the communication distance increases. Finally, satellite communication has high stability and is not limited by natural disasters.

NTN technology can be combined with various communication systems. For example, NTN technology can be combined with NR system as NR-NTN system. For another example, the NTN technology can be combined with IoT system to form IoT-NTN system. As an example, the IoT-NTN system may include an NB-IoT-NTN system and an eMTC-NTN system.

Figure 2:
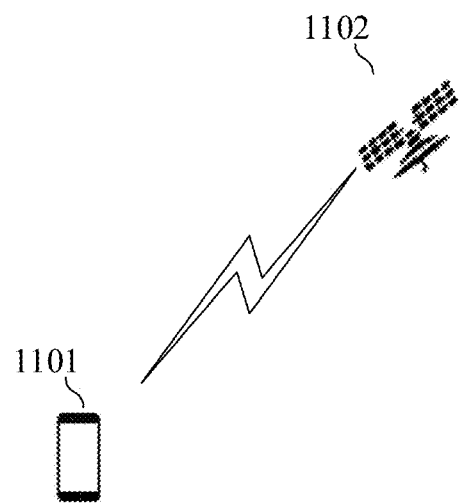

FIG. 2 is a schematic structural diagram of another communication system according to some embodiments of this application.

As shown in FIG. 2, a terminal device 1101 and a satellite 1102 are included, and wireless communication can be performed between the terminal device 1101 and the satellite 1102. The network formed between the terminal device 1101 and the satellite 1102 may also be referred to as NTN. In the architecture of the communication system shown in FIG. 2, the satellite 1102 can function as a base station, and the terminal device 1101 and the satellite 1102 can communicate with each other directly. Under this system architecture, the satellite 1102 may be referred to as a network device. In some embodiments of this application, the communication system may include multiple network devices 1102, and the coverage of each network device 1102 may include other numbers of terminal devices, which are not limited in embodiments of this application.

Figure 3:
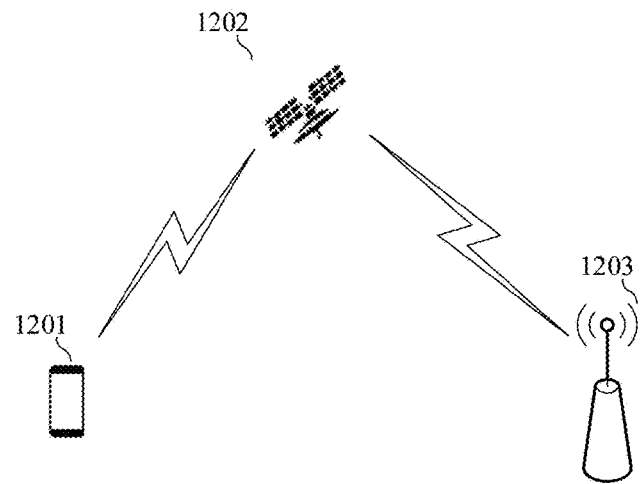

FIG. 3 is a schematic structural diagram of another communication system according to some embodiments of this application.

As shown in FIG. 3, it includes a terminal device 1201, a satellite 1202 and a base station 1203, where the terminal device 1201 and the satellite 1202 can wirelessly communicate with each other, and the satellite 1202 and the base station 1203 can communicate with each other. The network formed between the terminal device 1201, the satellite 1202 and the base station 1203 may also be referred to as NTN. In the architecture of the communication system shown in FIG. 3, the satellite 1202 may not have the function of base station, and the communication between the terminal device 1201 and the base station 1203 may need to be relayed through the satellite 1202. Under this system architecture, the base station 1203 may be referred to as a network device. In some embodiments of this application, the communication system may include multiple network devices 1203, and the coverage of each network device 1203 may include other numbers of terminal devices, which are not limited in embodiments of this application. The network device 1203 may be the network device 120 in FIG. 1.

It should be understood that the forgoing satellite 1102 or satellite 1202 includes but is not limited to: Low-Earth Orbit (LEO) satellites, Medium-Earth Orbit (MEO) satellites, Geostationary Earth Orbit (GEO) satellites, High Elliptical Orbit (HEO) satellites, and the like.

Satellites can use multiple beams to cover the ground. For example, a satellite may form dozens or even hundreds of beams to cover the ground. In other words, a satellite beam may cover a ground area with a diameter of tens to hundreds of kilometers to ensure satellite coverage and increase the system capacity of the entire satellite communication system.

As an example, the altitude range of LEO may be 500 km to 1500 km, the corresponding orbital period may be about 1.5 hours to 2 hours, the signal propagation delay of single-hop communication between users may generally be less than 20 ms, and the maximum satellite visibility time may be 20 minutes. The signal propagation distance of LEO is short and the link loss thereof is small, and the transmit power requirements of the user terminal are not high. The orbital height of GEO may be 35786 km, the rotation period around the earth may be 24 hours, and the signal propagation delay of single-hop communication between users may generally be 250 ms.

In order to ensure the coverage of satellites and improve the system capacity of the entire satellite communication system, satellites may use multiple beams to cover the ground. A satellite can form dozens or even hundreds of beams to cover the ground, with each satellite beam covering a ground area with a diameter of tens to hundreds of kilometers.

It should be noted that, FIG. 1 to FIG. 3 only illustrate systems to which this application applies in the form of examples, and of course, the methods shown in some embodiments of this application may also be applied to other systems. Furthermore, the terms "system" and "network" are often used interchangeably herein. The term "and/or" in this article is only used for describing an association relationship of associated objects, indicating that there may be three kinds of relationships. For example, when referring to A and/or B, it means three cases: A exists alone, both A and B exist, and B exist alone. In addition, the character "l" in this document generally indicates that the related objects are in an "or" relationship. It should also be understood that the "indication/instruction" mentioned in some embodiments of this application may be a direct indication, an indirect indication, or an associated relationship. For example, when referring to A indicates B, it may mean that A directly indicates B, for example, B can be obtained through A; or, it may also mean that A indicates B indirectly, for example, A indicates C, and B can be obtained through C; or, it may also mean that there is an association relationship between A and B. It should also be understood that the "correspondence" mentioned in some embodiments of this application may mean that there is a direct or indirect corresponding relationship between two objects, or may mean that there is an associated relationship, or a relationship of indicating and being indicated, or a relationship of configuring and being configured, between the two objects. It should also be understood that the "predefined" or "predefined rule(s)" mentioned in some embodiments of this application may be achieved by pre-storing corresponding codes and tables in devices (e.g., terminal device and network device) or achieved in other manners of indicating related information, and this application does not limit the specific implementation manner thereof. For example, "predefined" may refer to the definition in a protocol. It should also be understood that, in some embodiments of this application, the "protocol" may refer to a standard protocol in the communication field, such as LTE protocol, NR protocol, and related protocols applied in future communication systems, which are not limited in this application.

Satellites may be divided into two types: transparent payload and regenerative payload. For the transparent payload satellite (or Bent-Pipe Satellite), only the functions of radio frequency filtering, frequency conversion and amplification are provided, and only the transparent transmission of signal is provided without changing the waveform signal transmitted by itself. For the regenerative payload satellite (or Regenerative Satellite), in addition to the functions of radio frequency filtering, frequency conversion and amplification, it may also provide the functions of demodulation/decoding, routing/conversion, coding/modulation and, for example, may have some or all of the functions of the base station.

In NTN, one or more gateways may be included for communication between satellites and terminals.

Figure 4:
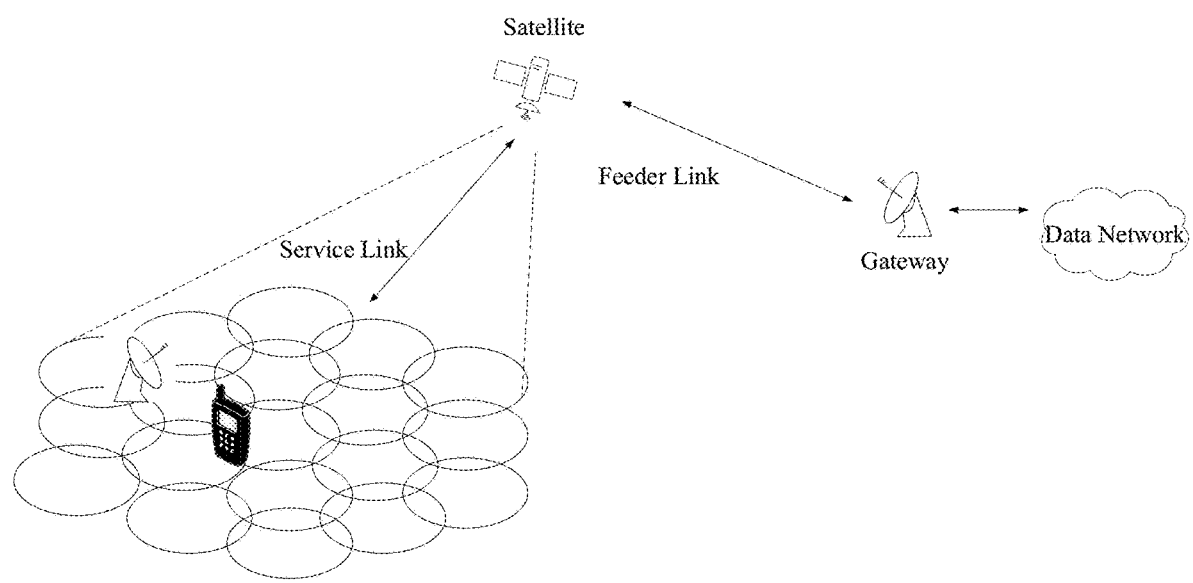
FIG. 4 and FIG. 5 respectively show schematic diagrams of NTN scenarios based on the transparent payload satellite and the regenerative payload satellite.
Figure 5:
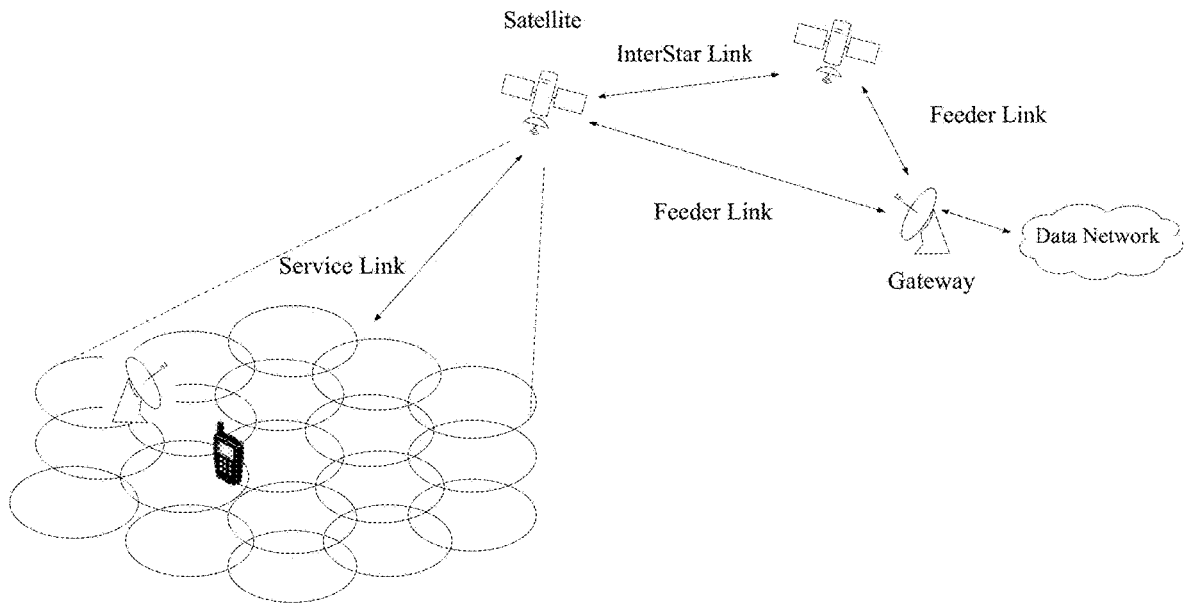

FIG. 4 and FIG. 5 respectively show schematic diagrams of NTN scenarios based on the transparent payload satellite and the regenerative payload satellite.

As shown in FIG. 4, for the NTN scenario based on transparent payload satellite, the communication between the gateway and the satellite is performed through the feeder link, and the communication between the satellite and the terminal is performed through the service link. As shown in FIG. 5, for the NTN scenario based on regenerative payload satellite, the communication between the satellite and the satellite is performed through the InterStar link, the communication between the gateway and the satellite is performed through the feeder link, and the communication between the satellite and the terminal is performed through the service link.

In the NTN system, like in the NR system, the UE needs to consider the influence of Timing Advance (TA) when performing uplink transmission. Since the propagation delay in the system is relatively large, the range of the TA value is relatively large. When the UE is scheduled to perform uplink transmission in time slot n (or subframe n), the UE considers the round-trip propagation delay (Round-Trip Time, RTT) and performs transmission in advance during uplink transmission, so that the signal falls within, when reaching the network device side, the uplink time slot n (or subframe n) at the network device side can be increased. Specifically, the timing relationship in the NTN system may include two cases, namely Case 1 and Case 2.

Figure 6:
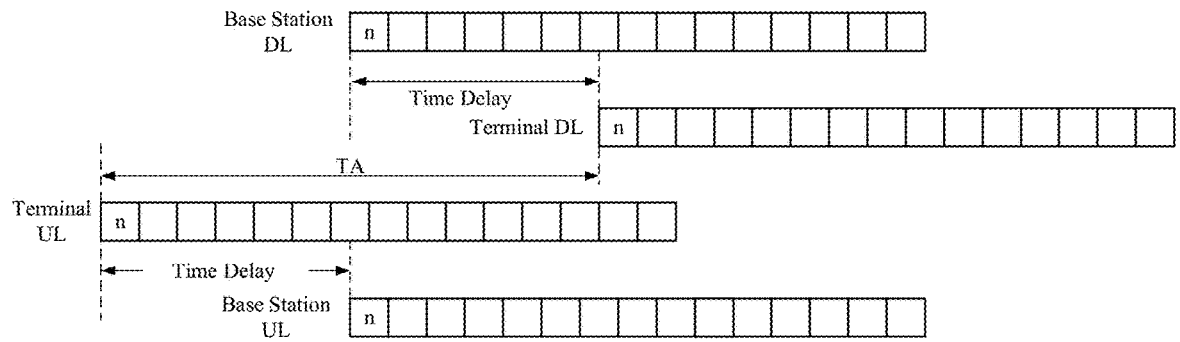
FIG. 6 is a schematic structural diagram of Case 1 in the timing relationship of the NTN system according to some embodiments of this application.

FIG. 6 is a schematic structural diagram of Case 1 in the timing relationship of the NTN system according to some embodiments of this application.

As shown in FIG. 6, for Case 1, the downlink subframe and the uplink subframe at the network device side are aligned with each other. Correspondingly, in order to align the uplink transmission of the UE, when it reaches the network device side, with the uplink subframe at the network device side, the UE needs to use a larger TA value. In some examples, the TA value corresponds to the timing offset value Koffset.

Figure 7:
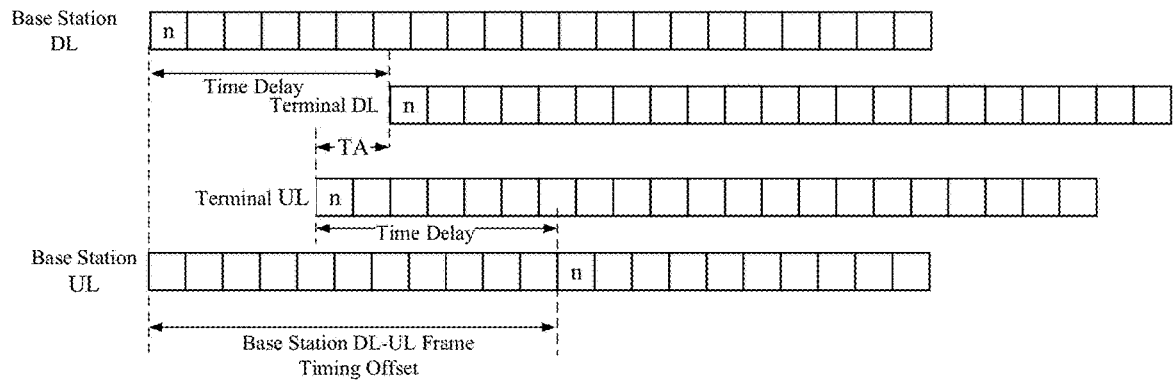
FIG. 7 is a schematic structural diagram of Case 2 in the timing relationship of the NTN system according to some embodiments of this application.

FIG. 7 is a schematic structural diagram of Case 2 in the timing relationship of the NTN system according to some embodiments of this application.

As shown in FIG. 7, for Case 2, there is an offset value between the downlink subframe and the uplink subframe at the network device side. In this case, in order to align the uplink transmission of the UE, when it reaches the network device side, with the uplink subframe at the network device side, the UE only needs to use a smaller TA value. In some examples, the TA value corresponds to the timing offset value Koffset. In other examples, the RTT of the UE corresponds to the timing offset value Koffset.

The timing relationship of control channel detection in the NB-IoT system is described below.

For the scheduling timing between the uplink grant and NPUSCH, assuming that an NB-IoT terminal device detects an NPDCCH corresponding to DCI format N0 (carrying an uplink grant) and the end position of the NPDCCH is in subframe n, or receives a random access response (RAR) granted NPDSCH and the end position of the NPDSCH is in subframe n, if the transmission of the corresponding (scheduled by the uplink grant) NPUSCH format 1 starts from subframe n+k, then the terminal device is not required to detect NPDCCH in any subframe between subframe n+1 to subframe n+k−1. FIG. 8 is a schematic diagram of subframes in which the terminal device does not detect NPDCCH according to some embodiments of this application. As shown in FIG. 8, assuming k=9, the subframes in which the terminal device does not detect NPDCCH include those subframes filled with shading lines.

For the timing between downlink grant and HARQ-ACK feedback, assuming that an NB-IoT terminal device detects an NPDCCH corresponding to DCI format N1 (carrying a downlink grant) and the end position of the NPDCCH is in subframe n, if the transmission of the corresponding (HARQ-ACK feedback corresponding to the NPDSCH scheduled by the downlink grant) NPUSCH format 2 starts from subframe n+k, then the terminal device is not required to detect NPDCCH in any subframe between subframe n+1 and subframe n+k−1. FIG. 9 is another schematic diagram of subframes in which the terminal device does not detect NPDCCH according to some embodiments of this application. As shown in FIG. 9, assuming k1=5, k2=13 and NPDSCH includes 4 subframes, FIG. 9 shows a schematic diagram of the subframes in which the terminal device does not detect NPDCCH, that is, the terminal device does not detect NPDCCH in subframe n to subframe n+20.

Herein, k=k1+k2; k1 represents the scheduling timing from DCI format N1 to NPDSCH. If the end position of the NPDCCH corresponding to DCI format N1 (carrying a downlink grant) is in subframe n, the start position of the scheduled NPDSCH is in subframe n+k1, where k1=5+k0, k0={0, 4, 8, 12, 16, 32, 64, 128} or {0, 16, 32, 64, 128, 256, 512, 1024}; k2 represents the feedback timing from NPDSCH to HARQ-ACK. If the end position of the NPDSCH is in subframe n, the start position of corresponding HARQ-ACK transmission is in subframe n+k2, where k2=k0-1, k0={13, 21} or {13, 15, 17, 18}.

Regarding the timing between NPUSCH and NPDCCH, if the end position of NPUSCH transmitted by an NB-IoT terminal device is subframe n, the terminal device is not required to detect NPDCCH in any subframe between subframe n+1 and subframe n+3. FIG. 10 is another schematic diagram of subframes in which the terminal device does not detect NPDCCH according to some embodiments of this application. As shown in FIG. 10, when the terminal device completes uplink transmission in subframe n, the NPDCCH is not detected in subframe n+1 to subframe n+3.

In the NR system, NTN is considered to provide communication services to users. However, due to the large propagation delay in the NTN system, the range of TA value is also relatively large. Correspondingly, the uplink and downlink timing relationship in the IoT-NTN system may need to be improved compared to the uplink and downlink timing relationship in the TN system. For example, the detection of control channel(s) in the IoT-NTN system may also need to be improved.

For example, for a terminal device in the IoT-NTN system, it does not have the ability to use the GNSS module and transmit and receive in the IoT-NTN system at the same time. The GNSS module is used for the terminal device to obtain synchronization information. For example, when the terminal device is in an idle state, if the terminal device receives a paging message or receives a wake up signal (WUS), the terminal device may need to perform time-frequency synchronization after receiving the paging message or WUS. Alternatively, the terminal device may need to perform time-frequency synchronization in advance, so as to receive the paging message or WUS. In this process, the terminal device may need to start the GNSS module to fix the GNSS position, such as completing GNSS TTFF (Time To First Fix), and then switch from the GNSS module to the IoT-NTN system working module, so as to obtain, through an NTN-SIB, the serving satellite ephemeris used for uplink synchronization. The GNSS TTFF usually takes a time period of 1 second (hot start, if the GNSS ephemeris corresponding to the last TTFF is obtained within 4 hours) or less than 5 seconds (warm start, if the GNSS ephemeris corresponding to the last TTFF is obtained within 180 days). In addition, the terminal device may not have the ability to simultaneously receive and transmit signals.

In addition, since the propagation delay in the NTN system is relatively large, the range of TA value is relatively large. Correspondingly, the uplink and downlink timing relationship in the IoT-NTN system may need to be improved compared to the uplink and downlink timing relationship in the TN system. In this case, the detection of control channel(s) in the IoT-NTN system may also need to be improved.

This application provides a wireless communication method and a terminal device. By enhancing the scheduling timing, the normal operation of the terminal device that does not have the capability of simultaneously receiving and transmitting signals can be ensured, and the effect of power saving can also be achieved.

FIG. 11 is a schematic flowchart of a wireless communication method 200 according to some embodiments of this application. The method 200 may be performed by a terminal device, for example, the terminal device shown in FIG. 1 to FIG. 5; for another example, a terminal device on the side link.

As shown in FIG. 11, the method 200 may include some or all of the following content.

In S210, based on at least one of a first offset value, a second offset value, and an HARQ-ACK feedback state, a control channel candidate is monitored.

In some embodiments, a time interval corresponding to the first offset value is associated with a TA value or an RTT of the terminal device; and a time interval corresponding to the second offset value is associated with synchronization information acquisition of the terminal device.

In some embodiments, the first offset value is configured to determine a scheduling timing of an uplink channel. The uplink channel includes at least one of a physical uplink shared channel (PUSCH), a physical uplink control channel (PUCCH) and a random access channel (PRACH).

In some embodiments, the first offset value is configured to determine a scheduling timing between an uplink grant and a physical uplink shared channel (PUSCH); and/or, the first offset value is configured to determine a scheduling timing between a physical downlink shared channel (PDSCH) and an HARQ-ACK feedback.

In some embodiments, the first offset value is predefined. Alternatively, the first offset value is configured by a network device through at least one of a system message, radio resource control (RRC), a medium access control (MAC) control element (CE), or downlink control information (DCI).

In some embodiments, the unit of the first offset value is a time unit or an absolute value. For example, the time unit includes, but is not limited to, a subframe, a time slot, a symbol, a frame, and the like. For example, the absolute value includes, but is not limited to, milliseconds, microseconds, seconds, and the like.

In some embodiments, the second offset value is configured to determine the scheduling timing between the downlink grant and the PDSCH.

In some embodiments, the second offset value is predefined.

Alternatively, the second offset value is configured by the network device through at least one of a system message, RRC, a MAC CE, or a DCI.

In some embodiments, the unit of the second offset value is a time unit or an absolute value. For example, the time unit includes, but is not limited to, a subframe, a time slot, a symbol, a frame, and the like. For example, the absolute value includes, but is not limited to, milliseconds, microseconds, seconds, and the like.

In some embodiments, the HARQ-ACK feedback state includes that the HARQ-ACK feedback of PDSCH is disabled; or the HARQ-ACK feedback state includes that the HARQ-ACK corresponding to PDSCH is in a non-feedback state.

In some embodiments, if a first HARQ process is configured as HARQ-ACK feedback disabled, the HARQ-ACK corresponding to the PDSCH transmitted using the first HARQ process is not fed back.

In some embodiments, the S210 may include following content.

If the first HARQ process corresponds to the HARQ-ACK feedback disabled state, and the end position of the first downlink shared channel corresponding to the first HARQ process received by the terminal device is in time unit n, the terminal device does not expect to monitor control channel candidate(s) in time units from time unit n+1 to time unit n+k, where k is a non-negative integer.

In some embodiments, the time unit includes, but is not limited to, subframes, time slots, symbols, frames, and the like.

In some embodiments, the S210 may include following content.

If the first HARQ process corresponds to the HARQ-ACK feedback disabled state, and the end position of the first downlink shared channel corresponding to the first HARQ process received by the terminal device is in subframe n, the terminal device does not expect to monitor control channel candidate(s) in any subframe from subframe n+1 to subframe n+12.

In some embodiments, the S210 may include:
determining, based on the first offset value, whether to monitor control channel candidate(s) in a time unit between an uplink grant and an uplink shared channel;
determining, based on the first offset value, whether to monitor control channel candidate(s) in a time unit between a PDCCH order and a random access channel;
determining, based on the first offset value, whether to monitor control channel candidate(s) in a time unit after transmission of an uplink shared channel or an uplink control channel;
determining, based on the first offset value, whether to monitor control channel candidate(s) in a time unit after transmission of a random access channel;

determining, based on the first offset value, whether to monitor control channel candidate(s) in a time unit between a downlink grant and an HARQ-ACK feedback corresponding to a downlink shared channel;

determining, based on the first offset value and the second offset value, whether to monitor control channel candidate(s) in a time unit between a downlink grant and an HARQ-ACK feedback corresponding to a downlink shared channel;

determining, based on the second offset value, whether to monitor control channel candidate(s) in a time unit between a downlink grant and a downlink shared channel In some embodiments, the first offset value corresponds to Koffset1. For example, the first offset value is Koffset1. For another example, Koffset1 is a value, with a unit of time unit (e.g., subframe), obtained according to a time interval corresponding to the first offset value.

In some embodiments, whether to monitor the control channel candidate in the time unit between the uplink grant and the uplink shared channel is determined based on the first offset value.

In some embodiments, if the end position of a first downlink control channel carrying a first uplink grant (e.g., corresponding to DCI format N0) received by the terminal device is in subframe n, and if the transmission of a first uplink shared channel corresponding to the first uplink grant (e.g., corresponding to NPUSCH format 1) starts from subframe n+k+Koffset1, then the terminal device is not required to monitor downlink control channel candidate in any subframe from subframe n+k+i−2 to subframe n+k+i−1. Optionally, such embodiments may be applied to downlink control channel candidate monitoring in a UE-specific search space where the terminal device is configured with two HARQ processes.

In some embodiments, if the end position of the first downlink control channel carrying the first uplink grant (e.g., corresponding to DCI format N0) received by the terminal device is in subframe n, and if the transmission of the first uplink shared channel corresponding to the first uplink grant (e.g., corresponding to NPUSCH format 1) starts from subframe n+k+Koffset1, then the terminal device does not expect to receive a second downlink control channel carrying a second uplink grant (e.g., corresponding to DCI format N0), where the transmission end position of a second uplink shared channel corresponding to the second uplink grant (e.g., corresponding to NPUSCH format 1) is later than subframe n+k+i+255. Optionally, such embodiments may be applied to downlink control channel candidate monitoring in a UE-specific search space where the terminal device is configured with two HARQ processes.

In some embodiments, if the end position of the first downlink control channel carrying the first uplink grant (e.g., corresponding to DCI format N0) received by the terminal device is in subframe n, and if the transmission of the first uplink shared channel corresponding to the first uplink grant (e.g., corresponding to NPUSCH format 1) starts from subframe n+k+Koffset1, then, for TDD, assuming that the transmission end position of the first uplink shared channel corresponding to the first uplink grant (e.g., corresponding to NPUSCH format 1) is located in subframe n+m+Koffset1, the terminal device is not required to monitor downlink control channel candidate in any subframe between subframe n+k+i to subframe n+m+i−1. Optionally, such embodiments may be applied to downlink control channel candidate monitoring in a UE-specific search space where the terminal device is configured with two HARQ processes.

In some embodiments, if the end position of the first downlink control channel carrying the first uplink grant (e.g., corresponding to DCI format N0) received by the terminal device is in subframe n, or, if the end position of the first downlink shared channel carrying an RAR grant received by the terminal device is in subframe n; and if the transmission of the first uplink shared channel corresponding to the first uplink grant or RAR grant (e.g., corresponding to NPUSCH format 1) starts in subframe n+k+Koffset1, then the terminal device is not required to monitor downlink control channel candidate in any subframe between subframe n+1 and subframe n+k+i−1.

In some embodiments, for TDD, if the end position of the first downlink control channel carrying the first uplink grant (e.g., corresponding to DCI format N0) received by the terminal device is in subframe n, or, if the end position of the first downlink shared channel carrying an RAR grant received by the terminal device is in subframe n; and if the transmission end position of the first uplink shared channel corresponding to the first uplink grant or RAR grant (e.g., corresponding to NPUSCH format 1) n subframe n+k+Koffset1, then the terminal device is not required to monitor downlink control channel candidate in any subframe between subframe n+1 and subframe n+k+i.

In some embodiments, for the UE-specific search space, assuming that the terminal device is configured with two HARQ processes:

if the end position of the first downlink control channel carrying the first uplink grant (e.g., corresponding to DCI format N0) received by the terminal device is in subframe n, and if the transmission of the first uplink shared channel corresponding to the first uplink grant (e.g., corresponding to NPUSCH format 1) starts from subframe n+k+Koffset1, then, the terminal device is not required to monitor downlink control channel candidate in any subframe between subframe n+k+i−2 and subframe n+k+i−1; or the terminal device does not expect to receive a second downlink control channel carrying a second uplink grant (e.g., corresponding to DCI format N0) before subframe n+k+i−2, where the transmission end position of the second uplink shared channel corresponding to the second uplink grant (e.g., corresponding to NPUSCH of format 1) is later than subframe n+k+i+255.

Alternatively, for TDD, if the transmission end position of the first uplink shared channel corresponding to the first uplink grant (e.g., corresponding to NPUSCH format 1) is located in subframe n+m+Koffset1, then the terminal device is not required to monitor downlink control channel candidate in any subframe between subframe n+k+i to subframe n+m+i−1; otherwise:

if the end position of the first downlink control channel carrying the first uplink grant (e.g., corresponding to DCI format N0) received by the terminal device is in subframe n, or, if the end position of the first downlink shared channel carrying an RAR grant received by the terminal device is in subframe n, and if the transmission of the first uplink shared channel corresponding to the first uplink grant or the RAR grant (e.g., corresponding to NPUSCH format 1) starts from subframe n+k+Koffset1, then the terminal device is not required to monitor downlink control channel candidate in any subframe between subframe n+1 and subframe n+k+i−1.

Alternatively, for TDD, if the end position of the first downlink control channel carrying the first uplink grant (e.g., corresponding to DCI format N0) received by the terminal device is in subframe n, or, if the end position of the first downlink shared channel carrying the RAR grant received by the terminal device is in subframe n, and if the transmission end position of the first uplink shared channel corresponding to the first uplink grant or the RAR grant (e.g., corresponding to NPUSCH format 1) is in subframe n+k+Koffset1, then the terminal device is not required to monitor downlink control channel candidate in any subframe between subframe n+1 and subframe n+k+i.

In some embodiments, i is greater than or equal to zero. For example i=0. For another example, i=Koffset1.

In some embodiments, i is an integer.

As an example, for the monitoring of the downlink control channel candidate between the uplink grant and the uplink shared channel, at least the following manners may be included.

Manner 1

For UE-specific search space, assuming that the terminal device is configured with two HARQ processes:

if the end position of the first downlink control channel carrying the first uplink grant (e.g., corresponding to DCI format N0) received by the terminal device is in subframe n, and if the transmission of the first uplink shared channel corresponding to the first uplink grant (e.g., corresponding to NPUSCH format 1) starts from subframe n+k+Koffset1, then:
  the terminal device is not required to monitor downlink control channel candidate in any subframe between subframe n+k−2 and subframe n+k−1; or
  the terminal device does not expect to receive a second downlink control channel carrying a second uplink grant (e.g., corresponding to DCI format N0) before subframe n+k−2, where the transmission end position of the second uplink shared channel corresponding to the second uplink grant (e.g., corresponding to NPUSCH format 1 is later than subframe n+k+255.

Alternatively, for TDD, if the transmission end position of the first uplink shared channel corresponding to the first uplink grant (e.g., corresponding to NPUSCH format 1) is located in subframe n+m+Koffset1, then the terminal device is not required to monitor downlink control channel candidate in any subframe between subframe n+k and subframe n+m−1; otherwise:
  if the end position of the first downlink control channel carrying the first uplink grant (e.g., corresponding to DCI format N0) received by the terminal device is in subframe n, or, if the end position of the first downlink shared channel carrying an RAR grant received by the terminal device is in subframe n, and if the transmission of the first uplink shared channel corresponding to the first uplink grant or the RAR grant (e.g., corresponding to NPUSCH format 1) starts from subframe n+k+Koffset1, then the terminal device is not required to monitor downlink control channel candidate in any subframe between subframe n+1 and subframe n+k−1.

Alternatively, for TDD, if the end position of the first downlink control channel carrying the first uplink grant (e.g., corresponding to DCI format N0) received by the terminal device is in subframe n, or, if the end position of first downlink shared channel carrying the RAR grant received by the terminal device is in subframe n, and if the transmission end position of the first uplink shared channel corresponding to the first uplink grant or the RAR grant (e.g., corresponding to NPUSCH format 1) is in subframe n+k+Koffset1, then the terminal device is not required to monitor downlink control channel candidate in any subframe between subframe n+1 and subframe n+k.

Manner 2

For UE-specific search space, assuming that the terminal device is configured with two HARQ processes:

if the end position of the first downlink control channel carrying the first uplink grant (e.g., corresponding to DCI format N0) received by the terminal device is in subframe n, and if the transmission of the first uplink shared channel corresponding to the first uplink grant (e.g., corresponding to NPUSCH format 1) starts from subframe n+k+Koffset1, then:
  the terminal device is not required to monitor downlink control channel candidate in any subframe between subframe n+k+Koffset1−2 and subframe n+k+Koffset1−1; or
  the terminal device does not expect to receive a second downlink control channel carrying a second uplink grant (e.g., corresponding to DCI format N0) before subframe n+k+Koffset1−2, where the transmission end position of the second uplink shared channel corresponding to the second uplink grant (e.g., corresponding to NPUSCH format 1 is later than subframe n+k+Koffset1+255.

Alternatively, for TDD, if the transmission end position of the first uplink shared channel corresponding to the first uplink grant (e.g., corresponding to NPUSCH format 1) is located in subframe n+m+Koffset1, the terminal device is not required to monitor downlink control channel candidate in any subframe between subframe n+k+Koffset1 and subframe n+m+Koffset1-1; otherwise:
  if the end position of the first downlink control channel carrying the first uplink grant (e.g., corresponding to DCI format N0) received by the terminal device is in subframe n, or, if the end position of the first downlink shared channel carrying an RAR grant received by the terminal device is in subframe n, and if the transmission of the first uplink shared channel corresponding to the first uplink grant or the RAR grant (e.g., corresponding to NPUSCH format 1) starts from subframe n+k+Koffset1, then the terminal device is not required to monitor downlink control channel candidate in any subframe between subframe n+1 and subframe n+k+Koffset1−1.

Alternatively, for TDD, if the end position of the first downlink control channel carrying the first uplink grant (e.g., corresponding to DCI format N0) received by the terminal device is in subframe n, or, if the end position of the first downlink shared channel carrying the RAR grant received by the terminal device is in subframe n, and if the transmission end position of the first uplink shared channel corresponding to the first uplink grant or the RAR grant (e.g., corresponding to NPUSCH format 1) is in subframe n+k+Koffset1, then the terminal device is not required to monitor downlink control channel candidate in any subframe between subframe n+1 and subframe n+k+Koffset1.

In some embodiments, whether to monitor the control channel candidate in the time unit between a PDCCH order and a random access channel is determined based on the first offset value.

In some embodiments, assuming that the end position of the first downlink control channel that carries the PDCCH order (e.g., corresponding to DCI format N1) received by the terminal device is in subframe n, for frequency division duplexing (FDD), if the transmission of the corresponding first random access channel (e.g., NPRACH) starts from subframe n+k+Koffset1, then the terminal device is not required to monitor downlink control channel candidate in any subframe between subframe n+1 and subframe n+k+i−1.

In some embodiments, assuming that the end position of the first downlink control channel that carries the PDCCH order (e.g., corresponding to DCI format N1) received by the terminal device is in subframe n, for TDD, if the transmission end position of the corresponding first random access channel (e.g., NPRACH) is in subframe n+k+Koffset1, then the terminal device is not required to monitor downlink control channel candidate in any subframe between subframe n+1 and subframe n+k+i−1.

In some embodiments, i is greater than or equal to zero. For example i=0. For another example, i=Koffset1.

In some embodiments, i is an integer.

As an example, for the monitoring of downlink control channel candidate between the PDCCH order and the random access channel, at least the following manners may be included.

Manner 1

Assuming that the end position of the first downlink control channel that carries the PDCCH order (e.g., corresponding to DCI format N1) received by the terminal device is in subframe n:
  for FDD, if the transmission of the corresponding first random access channel (e.g., NPRACH) starts from subframe n+k+Koffset1, then the terminal device is not required to monitor downlink control channel candidate in any subframe between subframe n+1 and subframe n+k−1; or
  for TDD, if the transmission end position of the corresponding first random access channel (e.g., NPRACH) is in subframe n+k+Koffset1, then the terminal device is not required to monitor downlink control channel candidate in any subframe between subframe n+1 and subframe n+k−1.

Manner 2

Assuming that the end position of the first downlink control channel that carries the PDCCH order (e.g., corresponding to DCI format N1) received by the terminal device is in subframe n:
  for FDD, if the transmission of the corresponding first random access channel (e.g., NPRACH) starts from subframe n+k+Koffset1, then the terminal device is not required to monitor downlink control channel candidate in any subframe between subframe n+1 and subframe n+k+Koffset1−1; or
  for TDD, if the transmission end position of the corresponding first random access channel (e.g., NPRACH) is in subframe n+k+Koffset1, then the terminal device is not required to monitor downlink control channel candidate in any subframe between subframe n+1 and subframe n+k+Koffset1−1.

In some embodiments, it is determined based on the first offset value whether to monitor the control channel candidate in the time unit after transmission of the uplink shared channel or uplink control channel.

In some embodiments, assuming that the first uplink channel (an uplink shared channel such as NPUSCH) sent by the terminal device ends in subframe n, for FDD, if the Type B half-duplex guard period(s) is configured, then the terminal device is not required to receive transmission within the Type B half-duplex guard period(s). Optionally, the terminal device is configured with two HARQ processes.

In some embodiments, if the first uplink channel (an uplink shared channel such as NPUSCH) sent by the terminal device ends in subframe n, for FDD, if the Type B half-duplex guard period(s) is configured, then the terminal device does not expect to receive a downlink control channel (e.g., corresponding to DCI format N0 or N1) scheduled to be transmitted based on a first HARQ process ID in any subframe between subframe n+1−j1 and subframe n+j2, where the first HARQ process number is an HARQ process number used for transmission of the first uplink channel, and j2>1. Optionally, the terminal device is configured with two HARQ processes.

In some embodiments, if the first uplink channel (an uplink shared channel such as NPUSCH) sent by the terminal device ends in subframe n, and if the terminal device does not use a high-level (or, upper-layer) EDT parameter configuration or if the terminal device uses the high-level EDT parameter configuration while the MCS index satisfies 0≤MCS index then the terminal device is not required to monitor downlink control channel candidate in any subframe between subframes n+1−j1 and subframe n+j2. Optionally, the terminal device is configured with two HARQ processes.

In some embodiments, assuming that the transmission end position of the first uplink channel (an uplink shared channel such as NPUSCH), corresponding to Msg3 and with a transport block size (TBS) thereof being the first TBS value, sent by the terminal device is in subframe n1, where the transmission end position of the first uplink channel will be in subframe n if the TBS is selected to be the maximum TBS value, then the terminal device is not required to monitor downlink control channel candidate in any subframe between subframe n+1−j1 to subframe n+j2.

In some embodiments, if the terminal device is configured with two HARQ processes, and the end position of the first uplink channel (an uplink shared channel such as NPUSCH) sent by the terminal device is in subframe n:
  for FDD, if the Type B half-duplex guard period(s) is configured, then the terminal device is not required to receive transmission within the Type B half-duplex guard period(s); and,
  the terminal device does not expect to receive a downlink control channel (e.g., corresponding to DCI format N0 or N1) scheduled to be transmitted based on the first HARQ process number in any subframe between subframes n+1−j1 and subframe n+j2, where the first HARQ process number is an HARQ process number used for transmission of the first uplink channel, and j2>1.

Alternatively, if the terminal device is not configured with the high-level EDT parameter, or is configured with a high-level EDT parameter and the MCS index satisfies 0≤MCS index≤2, then the terminal device is not required to monitor downlink control channel candidate in any subframe between subframe n+1 j1 and subframe n+j2;
  otherwise:
    assuming that the transmission end position of the first uplink channel (an uplink shared channel such as NPUSCH), corresponding to Msg3 and with a TBS thereof being the first TBS value, sent by the terminal device is in subframe n1, where the transmission end position of the first uplink channel will be in subframe n if the TBS is selected to be the maximum TBS value, then the terminal device is not required to monitor downlink control channel candidate in any subframe between subframe n+1−j1 and subframe n+j2.

In some embodiments, j1 is greater than or equal to zero.

In some embodiments, j1=0, j2=Koffset3.

In some embodiments, j1=0, j2=Koffset3+3.

In some embodiments, j1=Koffset1, j2=3−Koffset1.

In some embodiments, Koffset3 is determined based on Koffset1 or the first offset value.

In some embodiments, Koffset3 and Koffset1 are the same.

In some embodiments, Koffset3 is half of Koffset1 or Koffset3 is a round of half of Koffset1.

As an example, for the monitoring of downlink control channel candidate after uplink channel transmission, at least the following three manners may be included.

Manner 1

Assuming that the terminal device is configured with two HARQ processes, and the end position of the first uplink channel (an uplink shared channel such as NPUSCH) sent by the terminal device is in subframe n:

for FDD, if the Type B half-duplex guard period(s) is configured, then the terminal device is not required to receive transmission within the Type B half-duplex guard period(s); and, the terminal device does not expect to receive a downlink control channel (e.g., corresponding to DCI format N0 or N1) scheduled to be transmitted based on the first HARQ process number in any subframe between subframes n+1 and subframe n+Koffset3+3, where the first HARQ process number is an HARQ process number used for transmission of the first uplink channel.

Alternatively, if the terminal device is not configured with the high-level EDT parameter, or is configured with a high-level EDT parameter and the MCS index satisfies 0≤MCS index≤2, then the terminal device is not required to monitor downlink control channel candidate in any subframe between subframe n+1 and subframe n+Koffset3+3;

otherwise:

assuming that the transmission end position of the first uplink channel (an uplink shared channel such as NPUSCH), corresponding to Msg3 and with a TBS thereof being the first TBS value, sent by the terminal device is in subframe n1, where the transmission end position of the first uplink channel will be in subframe n if the TBS is selected to be the maximum TBS value, then the terminal device is not required to monitor downlink control channel candidate in any subframe between subframe n+1 and subframe n+Koffset3+3.

Manner 2

Assuming that the terminal device is configured with two HARQ processes, and the end position of the first uplink channel (an uplink shared channel such as NPUSCH) sent by the terminal device is in subframe n:

for FDD, if the Type B half-duplex guard period(s) is configured, then the terminal device is not required to receive transmission within the Type B half-duplex guard period(s); and, the terminal device does not expect to receive a downlink control channel (e.g., corresponding to DCI format N0 or N1) scheduled to be transmitted based on the first HARQ process number in any subframe between subframes n+1 and subframe n+Koffset3, where the first HARQ process number is an HARQ process number used for transmission of the first uplink channel.

Alternatively, if the terminal device is not configured with the high-level EDT parameter, or is configured with a high-level EDT parameter and the MCS index satisfies 0≤MCS index≤2, then the terminal device is not required to monitor downlink control channel candidate in any subframe between subframe n+1 and subframe n+Koffset3;

otherwise:

assuming that the transmission end position of the first uplink channel (an uplink shared channel such as NPUSCH), corresponding to Msg3 and with a TBS thereof being the first TBS value, sent by the terminal device is in subframe n1, where the transmission end position of the first uplink channel will be in subframe n if the TBS is selected to be the maximum TBS value, then the terminal device is not required to monitor downlink control channel candidate in any subframe between subframe n+1 and subframe n+Koffset3.

Manner 3

Assuming that the terminal device is configured with two HARQ processes, and the end position of the first uplink channel (an uplink shared channel such as NPUSCH) sent by the terminal device is in subframe n:

for FDD, if the Type B half-duplex guard period(s) is configured, then the terminal device is not required to receive transmission within the Type B half-duplex guard period(s); and, the terminal device does not expect to receive a downlink control channel (e.g., corresponding to DCI format N0 or N1) scheduled to be transmitted based on the first HARQ process number in any subframe between subframes n+1−Koffset1 and subframe n+3−Koffset1, where the first HARQ process number is an HARQ process number used for transmission of the first uplink channel.

Alternatively, if the terminal device is not configured with the high-level EDT parameter, or is configured with a high-level EDT parameter and the MCS index satisfies 0≤MCS index≤2, then the terminal device is not required to monitor downlink control channel candidate in any subframe between subframe n+1−Koffset1 and subframe n+3−Koffset1;

otherwise:

assuming that the transmission end position of the first uplink channel (an uplink shared channel such as NPUSCH), corresponding to Msg3 and with a TBS thereof being the first TBS value, sent by the terminal device is in subframe n1, where the transmission end position of the first uplink channel will be in subframe n if the TBS is selected to be the maximum TBS value, then the terminal device is not required to monitor downlink control channel candidate in any subframe between subframe n+1−Koffset1 and subframe n+3−Koffset1.

In some embodiments, Koffset3 is determined based on Koffset1 or the first offset value.

In some embodiments, Koffset3 and Koffset1 are the same.

In some embodiments, Koffset3 is half of Koffset1 or Koffset3 is a round of half of Koffset1.

In some embodiments, whether to monitor control channel candidate in time units after random access channel transmission is determined based on the first offset value.

In some embodiments, assuming that the transmission end position of a random access preamble sequence (e.g., narrowband random access preamble) for SR is in subframe n, in the scenario of frame structure type 1, if the random access channel formats 0 and 1 are used and the number of repetitions of the random access channel is greater than or equal to 64; or if the random access channel format 2 is used and the number of repetitions of the random access channel is greater than or equal to 16, then the terminal device is not required to monitor the UE-specific downlink control channel search space between subframe n−j3 and subframe n+j4.

Optionally, these embodiments are applicable to the case where the terminal device is configured with the high-level parameter sr-WithoutHARQ-ACK-Config.

In some embodiments, assuming that the transmission end position of the random access preamble sequence (e.g., narrowband random access preamble) for SR is in subframe n, in the scenario of being not frame structure type 1, or if the random access channel formats 0 and 1 are used and the number of repetitions of the random access channel is less than 64; or if the random access channel format 2 is used and the number of repetitions of the random access channel is less than 16, then the terminal device is not required to monitor the UE-specific downlink control channel search space between subframe n−j3 and subframe n+j5. Optionally, these embodiments are applicable to the case where the terminal device is configured with the high-level parameter sr-WithoutHARQ-ACK-Config.

In some embodiments, if the transmission end position of the random access preamble sequence (e.g., narrowband random access preamble) for SR is in subframe n, then the terminal device is not required to monitor the UE-specific downlink control channel search space between subframe n−j3 and subframe n+j5. Optionally, these embodiments are applicable to the case where the terminal device is configured with the high-level parameter sr-WithoutHARQ-ACK-Config.

In some embodiments, when the terminal device is configured with the high-level parameter sr-WithoutHARQ-ACK-Config, if the transmission end position of the random access preamble sequence (e.g., narrowband random access preamble) for SR is in subframe n:
- in the scenario of frame structure type 1, if the random access channel formats 0 and 1 are used and the number of repetitions of the random access channel is greater than or equal to 64; or if the random access channel format 2 is used and the number of repetitions of the random access channel is greater than or equal to 16, then the terminal device is not required to monitor the UE-specific downlink control channel search space between subframe n−j3 and subframe n+j4;
- otherwise, the terminal device is not required to monitor the UE-specific downlink control channel search space from subframe n−j3 to subframe n+j5.

In some embodiments, j3=0, j4=Koffset3+40, j5=Koffset3+3.

In some embodiments, j3=0, j4=40, j5=Koffset3.

In some embodiments, j3=Koffset1, j4=40−Koffset1, j5=3−Koffset3.

As an example, the monitoring of the downlink control channel search space after the random access channel transmission may at least include the following manner.

Manner 1

When the terminal device is configured with the high-level parameter sr-WithoutHARQ-ACK-Config, if the transmission end position of the random access preamble sequence (e.g., narrowband random access preamble) for SR is in subframe n:
- in the scenario of frame structure type 1, if the random access channel formats 0 and 1 are used and the number of repetitions of the random access channel is greater than or equal to 64; or if the random access channel format 2 is used and the number of repetitions of the random access channel is greater than or equal to 16, then the terminal device is not required to monitor the UE-specific downlink control channel search space between subframe n and subframe n+Koffset3+40;
- otherwise, the terminal device is not required to monitor the UE-specific downlink control channel search space from subframe n to subframe n+Koffset3+3.

Manner 2

When the terminal device is configured with the high-level parameter sr-WithoutHARQ-ACK-Config, if the transmission end position of the random access preamble sequence (e.g., narrowband random access preamble) for SR is in subframe n:
- in the scenario of frame structure type 1, if the random access channel formats 0 and 1 are used and the number of repetitions of the random access channel is greater than or equal to 64; or if the random access channel format 2 is used and the number of repetitions of the random access channel is greater than or equal to 16, then the terminal device is not required to monitor the UE-specific downlink control channel search space between subframe n and subframe n+40;
- otherwise, the terminal device is not required to monitor the UE-specific downlink control channel search space from subframe n to subframe n+Koffset3.

Manner 3

When the terminal device is configured with the high-level parameter sr-WithoutHARQ-ACK-Config, if the transmission end position of the random access preamble sequence (e.g., narrowband random access preamble) for SR is in subframe n:
- in the scenario of frame structure type 1, if the random access channel formats 0 and 1 are used and the number of repetitions of the random access channel is greater than or equal to 64; or if the random access channel format 2 is used and the number of repetitions of the random access channel is greater than or equal to 16, then the terminal device is not required to monitor the UE-specific downlink control channel search space between subframe n−Koffset1 and subframe n+40−Koffset1;
- otherwise, the terminal device is not required to monitor the UE-specific downlink control channel search space from subframe n−Koffset1 and subframe n+3−Koffset1.

In some embodiments, whether to monitor the control channel candidate in the time unit between a downlink grant and an HARQ-ACK feedback corresponding to a downlink shared channel is determined based on the first offset value.

In some embodiments, if the end position of the first downlink control channel carrying the first downlink grant (e.g., corresponding to DCI format N1) received by the terminal device is in subframe n, and the transmission of the downlink shared channel corresponding to the first downlink grant starts from subframe n+k:
- for FDD, if the transmission of the corresponding first uplink channel (e.g., corresponding to NPUSCH format 2) carrying HARQ-ACK information starts from subframe n+m+Koffset1, then the terminal device is not required to monitor downlink control channel candidate in any subframe between subframe n+k and subframe n+m+i−1; or
- for TDD, if the transmission end position of the corresponding first uplink channel (e.g., corresponding to NPUSCH format 2) carrying the HARQ-ACK information is in subframe n+m+Koffset1, then the terminal device is not required to monitor downlink control channel candidate in any subframe between subframe n+k and subframe n+m+i−1.

In some embodiments, i is greater than or equal to zero. For example, i=0. For another example, i=Koffset1.

In some embodiments, i is an integer.

As an example, for the monitoring of downlink control channel candidate between the downlink grant and the HARQ-ACK feedback corresponding to the downlink shared channel, at least the following manner may be included.

Manner 1

Assuming that the end position of the first downlink control channel carrying the first downlink grant (e.g., corresponding to DCI format N1) received by the terminal device is in subframe n, and the transmission of the downlink shared channel corresponding to the first downlink grant starts from subframe n+k:

for FDD, if the transmission of the corresponding first uplink channel (e.g., corresponding to NPUSCH format 2) carrying HARQ-ACK information starts from subframe n+m+Koffset1, then the terminal device is not required to monitor downlink control channel candidate in any subframe between subframe n+k and subframe n+m−1; or for TDD, if the transmission end position of the corresponding first uplink channel (e.g., corresponding to NPUSCH format 2) carrying the HARQ-ACK information is in subframe n+m+Koffset1, then the terminal device is not required to monitor downlink control channel candidate in any subframe between subframe n+k and subframe n+m−1.

Manner 2

Assuming that the end position of the first downlink control channel carrying the first downlink grant (e.g., corresponding to DCI format N1) received by the terminal device is in subframe n, and the transmission of the downlink shared channel corresponding to the first downlink grant starts from subframe n+k:

for FDD, if the transmission of the corresponding first uplink channel (e.g., corresponding to NPUSCH format 2) carrying HARQ-ACK information starts from subframe n+m+Koffset1, then the terminal device is not required to monitor downlink control channel candidate in any subframe between subframe n+k and subframe n+m+Koffset1−1; or for TDD, if the transmission end position of the corresponding first uplink channel (e.g., corresponding to NPUSCH format 2) carrying the HARQ-ACK information is in subframe n+m+Koffset1, then the terminal device is not required to monitor downlink control channel candidate in any subframe between subframe n+k and subframe n+m+Koffset1−1.

In some embodiments, the second offset value corresponds to Koffset2. For example, the second offset value is Koffset2. For another example, Koffset2 is a value, in a unit of time such as a subframe, which is obtained according to a time interval corresponding to the second offset value.

In some embodiments, whether to monitor the control channel candidate in the time unit between the downlink grant and the HARQ-ACK feedback corresponding to the downlink shared channel is determined based on the first offset value and the second offset value.

In some embodiments, if the end position of the first downlink control channel carrying the first downlink grant (e.g., corresponding to DCI format N1) received by the terminal device is in subframe n, and the transmission of the first downlink shared channel corresponding to the first downlink grant starts from subframe n+k+Koffset2:

for FDD, if the transmission of the corresponding first uplink channel (e.g., corresponding to NPUSCH format 2) carrying HARQ-ACK information starts from subframe n+m+Koffset1, then the terminal device is not required to monitor downlink control channel candidate in any subframe between subframe n+k+Koffset2 and subframe n+m+Koffset1−1; or for TDD, if the transmission end position of the corresponding first uplink channel (e.g., corresponding to NPUSCH format 2) carrying the HARQ-ACK information is in subframe n+m+Koffset1, then the terminal device is not required to monitor downlink control channel candidate in any subframe between subframe n+k+Koffset2 and subframe n+m+Koffset1−1.

In some embodiments, whether to monitor the control channel candidate in the time unit between the downlink grant and the downlink shared channel is determined based on the second offset value.

In some embodiments, if the end position of the first downlink control channel carrying the first downlink grant (e.g., corresponding to DCI format N1 or N2) received by the terminal device is in subframe n, and if the transmission of the first downlink shared channel starts from subframe n+k+Koffset2, then the terminal device is not required to monitor downlink control channel candidate in any subframe between subframe n+k+Koffset2−2 and subframe n+k+Koffset2−1. Optionally, such embodiments may be applied to monitoring of downlink control channel candidate in a UE-specific search space where the terminal device is configured with two HARQ processes.

In some embodiments, if the end position of the first downlink control channel carrying the first downlink grant (e.g., corresponding to DCI format N1 or N2) received by the terminal device is in subframe n, and if the transmission of the first downlink shared channel corresponding to the first downlink grant starts from subframe n+k+Koffset2, then the terminal device is not required to monitor downlink control channel candidate in any subframe between subframe n+1 and subframe n+k+Koffset2−1.

In some embodiments, with respect to the monitoring of downlink control channel candidate between the downlink grant and the downlink shared channel, for the UE-specific search space, assuming that the terminal device is configured with two HARQ processes:

if the end position of the first downlink control channel carrying the first downlink grant (e.g., corresponding to DCI format N1 or N2) received by the terminal device is in subframe n, and if the transmission of the first downlink shared channel starts from subframe n+k+Koffset2, then the terminal device is not required to monitor downlink control channel candidate in any subframe between subframe n+k+Koffset2−2 and subframe n+k+Koffset2−1;

otherwise:

if the end position of the first downlink control channel carrying the first downlink grant (e.g., corresponding to DCI format N1 or N2) received by the terminal device is in subframe n, and if the transmission of the first downlink shared channel corresponding to the first downlink grant starts from subframe n+k+Koffset2, then the terminal device is not required to monitor downlink control channel candidate in any subframe between subframe n+1 and subframe n+k+Koffset2−1.

In some embodiments, during the uplink (UL) gap of uplink channel transmission, the terminal device is not required to monitor downlink control channel candidate in the downlink control channel search space. Herein, the length of the UL gap may be greater than or equal to the first offset value.

Figure 12:
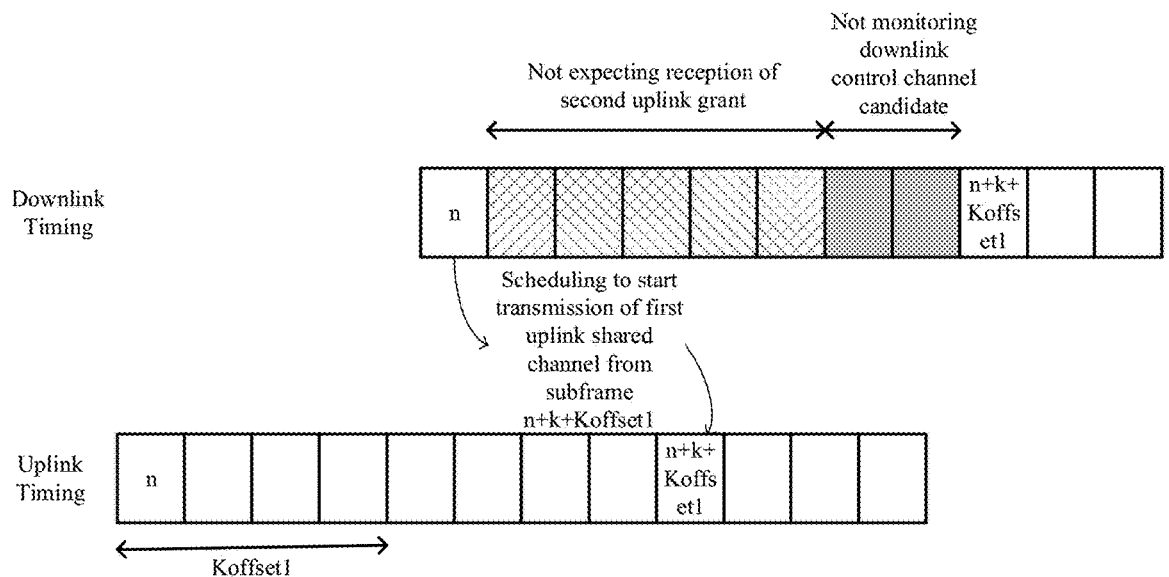
FIG. 12 is a schematic diagram of a subframe(s) in which the terminal device does not detect a control channel candidate according to some embodiments of this application.

FIG. 12 is a schematic diagram of a subframe(s) in which the terminal device does not detect a control channel candidate according to some embodiments of this application. As shown in FIG. 12, assuming that the terminal device is configured with two HARQ processes, for the UE-specific search space:

if the end position of the first downlink control channel carrying the first uplink grant (e.g., corresponding to DCI format N0) received by the terminal device is in subframe n, and if the transmission of the first uplink shared channel scheduled by the first uplink grant (e.g., corresponding to NPUSCH format 1) starts from subframe n+k+Koffset1, then: the terminal device is not required to monitor downlink control channel candidate in any subframe between subframe n+k+Koffset1−2 and subframe n+k+Koffset1−1; and/or, the terminal device does not expect to receive a second downlink control channel carrying a second uplink grant (e.g., corresponding to DCI format N0) before subframe n+k+Koffset1−2, where the transmission end position of the second uplink shared channel scheduled by the second uplink grant (e.g., corresponding to NPUSCH format 1) is later than subframe n+k+Koffset1+255.

Figure 13:
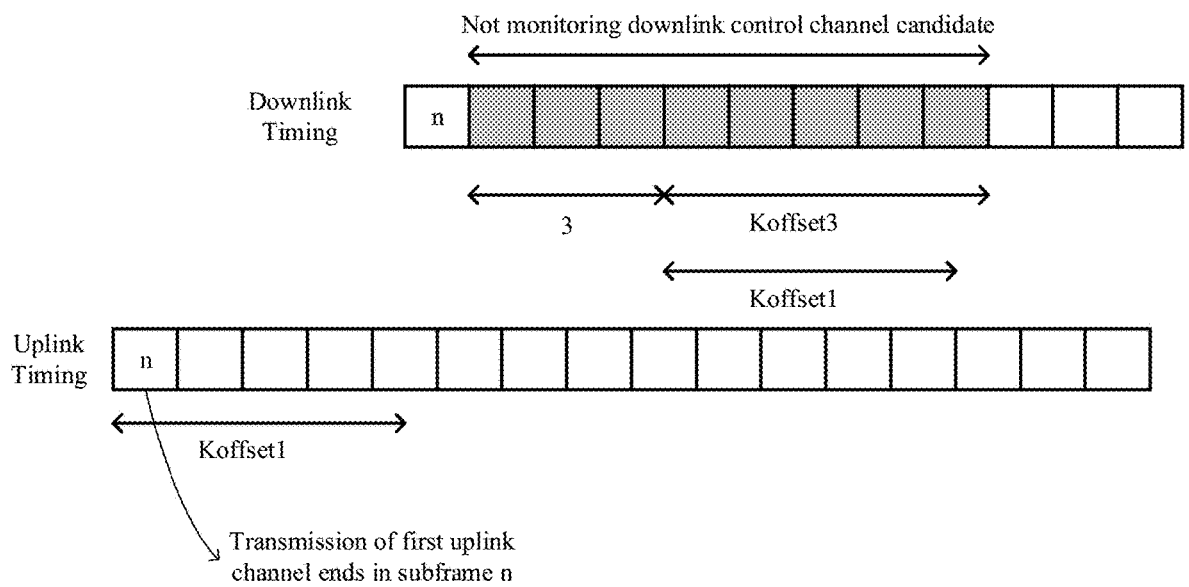
FIG. 13 is another schematic diagram of a subframe(s) in which the terminal device does not detect a control channel candidate according to some embodiments of this application.

FIG. 13 is another schematic diagram of a subframe(s) in which the terminal device does not detect a control channel candidate according to some embodiments of this application. As shown in FIG. 13, if the end position of the first uplink channel (e.g., an uplink shared channel NPUSCH) sent by the terminal device is in subframe n, then the terminal device is not required to monitor downlink control channel candidate in any subframe between subframe n+1 to subframe n+Koffset3+3. Herein, Koffset3 may be determined according to Koffset1.

In some embodiments, the terminal device is a terminal device in an IoT-NTN system. For example, the terminal device is a terminal device in an NB-IoT-NTN system or a terminal device in an eMTC-NTN system.

Some preferred embodiments of this application have been described in detail above with reference to the accompanying drawings. However, this application is not limited to the specific details of the forgoing embodiments. Within the scope of the technical concept of this application, various simple modifications can be made to the technical solutions of this application, which should fall within the protection scope of this application. For example, the various specific technical features described in the forgoing specific embodiments can be combined in any suitable manner under the condition of no contradiction. In order to avoid unnecessary repetition, this application does not describe the various possible combinations. For another example, the various embodiments of this application can also be combined arbitrarily, as long as they do not violate the idea of this application, which should also be regarded as the content disclosed in this application.

It should also be understood that, in the various method embodiments of this application, the size of the sequence numbers in the forgoing processes does not mean the sequence of execution, and the execution sequence of each process should be determined by its functions and internal logic, and should not constitute any limitation on the implementation of some embodiments of this application. In addition, in some embodiments of this application, the term "and/or" is only used for describing an association relationship of associated objects, indicating that there may be three kinds of relationships. Specifically, when referring to A and/or B, there cases may be indicated: A exists alone, both A and B exist, and B exists alone. In addition, the character "I" in this document generally indicates that the related objects are in an "or" relationship.

The apparatus/device embodiments of this application will be described in detail below with reference to FIG. 14 to FIG. 16.

Figure 14:
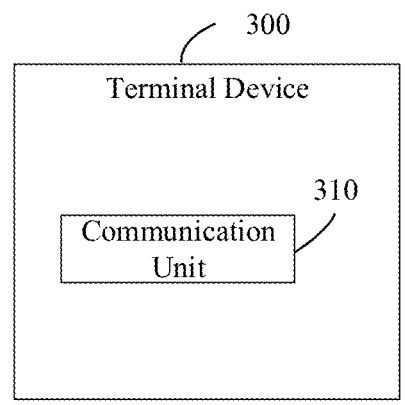
FIG. 14 and FIG. 15 are schematic block diagrams of terminal devices according to some embodiments of this application.

FIG. 14 is a schematic block diagram of a terminal device 300 according to some embodiments of this application.

As shown in FIG. 14, the terminal device 300 may include:

a communication unit 310, configured to monitor a control channel candidate based on at least one of a first offset value, a second offset value, or an HARQ-ACK feedback state; where a time interval corresponding to the first offset value is associated with a TA value or an RTT of the terminal device, and a time interval corresponding to the second offset value is associated with synchronization information acquisition of the terminal device.

In some embodiments, the first offset value is configured to determine a scheduling timing between an uplink grant and a PUSCH; and/or, the first offset value is configured to determine a scheduling timing between a PDSCH and an HARQ-ACK feedback.

In some embodiments, the first offset value is predefined; or, the first offset value is configured by a network device through at least one of a system message, RRC, MAC CE, or DCI.

In some embodiments, the unit of the first offset value is a time unit or an absolute value.

In some embodiments, the second offset value is configured to determine a scheduling timing between a downlink grant and a PDSCH.

In some embodiments, the second offset value is predefined; or, the second offset value is configured by a network device through at least one of a system message, RRC, a MAC CE, or DCI.

In some embodiments, the unit of the second offset value is a time unit or an absolute value.

In some embodiments, the HARQ-ACK feedback state includes that HARQ-ACK feedback of PDSCH is disabled; or the HARQ-ACK feedback state includes that HARQ-ACK corresponding to PDSCH is in a non-feedback state.

In some embodiments, if a first HARQ process is configured with disabling of HARQ-ACK feedback, the HARQ-ACK feedback corresponding to a PDSCH transmitted by using the first HARQ process is not performed.

In some embodiments, the communication unit 310 is specifically configured to:

if a first HARQ process corresponds to an HARQ-ACK feedback disabled state, and an end position of a first downlink shared channel corresponding to the first HARQ process received by the terminal device is in a time unit n, the terminal device does not expect to monitor the control channel candidate in time units from a time unit n+1 to a time unit n+k, where k is a non-negative integer.

In some embodiments, the communication unit 310 is specifically configured to:

if the first HARQ process corresponds to the HARQ-ACK feedback disabled state, and the end position of the first downlink shared channel corresponding to the first HARQ process received by the terminal device is in the subframe n, the terminal device does not expect to monitor the control channel candidate in any subframe ranging from the subframe n+1 to the subframe n+12.

In some embodiments, the communication unit 310 is specifically configured to:
- determine, based on the first offset value, whether to monitor the control channel candidate in a time unit between an uplink grant and an uplink shared channel;
- determine, based on the first offset value, whether to monitor the control channel candidate in a time unit between a PDCCH order and a random access channel;
- determine, based on the first offset value, whether to monitor the control channel candidate in a time unit after transmission of an uplink shared channel or an uplink control channel;
- determine, based on the first offset value, whether to monitor the control channel candidate in a time unit after transmission of a random access channel;
- determine, based on the first offset value, whether to monitor the control channel candidate in a time unit between a downlink grant and an HARQ-ACK feedback corresponding to a downlink shared channel;
- determine, based on the first offset value and the second offset value, whether to monitor the control channel candidate in a time unit between a downlink grant and an HARQ-ACK feedback corresponding to a downlink shared channel;
- determine, based on the second offset value, whether to monitor the control channel candidate in a time unit between a downlink grant and a downlink shared channel.

It should be understood that the device embodiments and the method embodiments may correspond to each other, and similar descriptions may refer to the method embodiments. Specifically, the terminal device 300 shown in FIG. 14 may correspond to the corresponding subject for performing the method 200 according to some embodiments of this application, and the aforementioned and other operations and/or functions of the various units in the terminal device 300 are respectively for the purpose of realizing the method shown in FIG. 11. For the sake of brevity, the corresponding processes in each of the methods are not repeated here.

The communication device according to some embodiments of this application is described above from the perspective of functional modules with reference to the accompanying drawings. It should be understood that the functional modules can be implemented in the form of hardware, can also be implemented by instructions in the form of software, and can also be implemented by a combination of hardware and software modules.

Specifically, the steps of the method embodiments in some embodiments of this application may be completed by hardware integrated logic circuits in the processor and/or instructions in the form of software, and the steps of the methods disclosed in conjunction with some embodiments of this application may be directly implemented and completed by a hardware decoding processor, or implemented and completed by a combination of hardware and software modules in the decoding processor.

Optionally, the software modules may be located in random access memory, flash memory, read-only memory, programmable read-only memory, electrically erasable programmable memory, registers, and other storage medium known in the art. The storage medium is located in the memory, and the processor reads the information in the memory, and completes the steps in the above method embodiments in combination with its hardware.

For example, the processing unit and the communication unit referred to above may be implemented by a processor and a transceiver, respectively.

Figure 15:
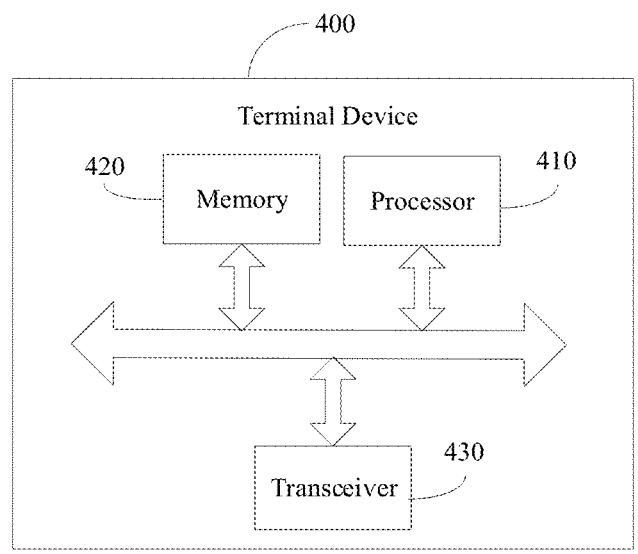

FIG. 15 is a schematic structural diagram of a terminal device 400 according to some embodiments of this application.

As shown in FIG. 15, the terminal device 400 may include a processor 410.

The processor 410 may call and run a computer program from a memory to implement the methods according to some embodiments of this application.

Referring to FIG. 15, the terminal device 400 may further include a memory 420.

In some embodiments, the memory 420 may be configured to store instruction information, and may also be configured to store codes, instructions, and the like executed by the processor 410. The processor 410 may call and run the computer program from the memory 420 to implement the methods according to some embodiments of this application. The memory 420 may be a separate device independent of the processor 410, or may be integrated in the processor 410.

Referring to FIG. 15, the terminal device 400 may further include a transceiver 430.

The processor 410 may control the transceiver 430 to communicate with other devices, specifically, may send information or data to other devices, or receive information or data sent by other devices. The transceiver 430 may include a transmitter and a receiver. The transceiver 430 may further include antennas, and the number of the antennas may be one or more.

It should be understood that each component in the terminal device 400 is connected through a bus system, where the bus system includes a power bus, a control bus and a state signal bus in addition to a data bus.

It should also be understood that the terminal device 400 may be the terminal device according to some embodiments of this application, and the terminal device 400 may implement the corresponding processes implemented by the terminal device in the various methods according to some embodiments of this application. The terminal device 400 may correspond to the terminal device 300 according to some embodiments of this application, and may correspond to the corresponding subject for performing the method 200 according to some embodiments of this application, which is not repeated here for brevity.

In addition, some embodiments of this application also provides a chip.

For example, the chip may be an integrated circuit chip, which has a signal processing capability, and can implement or execute the methods, steps, and logic block diagrams disclosed in some embodiments of this application. The chip may also be referred to as a system-level chip, a system chip, a chip system, a system-on-chip, or the like. Optionally, the chip can be applied to various communication devices, so that the communication device installed with the chip can execute the methods, steps and logic block diagrams disclosed in some embodiments of this application.

Figure 16:
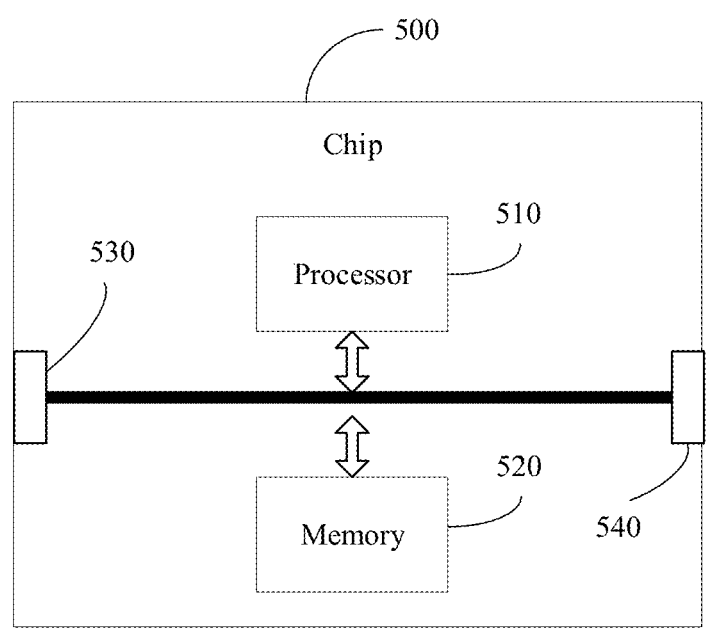
FIG. 16 is a schematic block diagram of a chip according to some embodiments of this application.

FIG. 16 is a schematic structural diagram of a chip 500 according to some embodiments of this application.

As shown in FIG. 16, the chip 500 includes a processor 510.

The processor 510 may call and run a computer program from a memory to implement the methods according to some embodiments of this application.

Referring to FIG. 16, the chip 500 may further include a memory 520.

The processor 510 may call and run the computer program from the memory 520 to implement the methods according to some embodiments of this application. The memory 520 may be configured to store instruction information, and may also be configured to store codes, instructions, and the like executed by the processor 510. The memory 520 may be a separate device independent of the processor 510, or may be integrated in the processor 510.

Referring to FIG. 16, the chip 500 may further include an input interface 530.

The processor 510 may control the input interface 530 to communicate with other devices or chips, and specifically, may acquire information or data sent by other devices or chips.

Referring to FIG. 16, the chip 500 may further include an output interface 540.

The processor 510 may control the output interface 540 to communicate with other devices or chips, and specifically, may output information or data to other devices or chips.

It should be understood that the chip 500 can be applied to the network device according to some embodiments of this application, and the chip can implement the corresponding processes implemented by the network device in the various methods according to some embodiments of this application, and can also implement the corresponding processes implemented by the terminal device in the various methods according to some embodiments of this application, which is not repeated here for brevity.

It should also be understood that each component in the chip 500 is connected through a bus system, where the bus system includes a power bus, a control bus and a state signal bus in addition to a data bus.

The processors referred to above may include, but are not limited to:

general-purpose processor, Digital Signal Processor (DSP), Application Specific Integrated Circuit (ASIC), Field Programmable Gate Array (FPGA), other programmable logic devices, discrete gates or transistor logic devices, discrete hardware components, and so on.

The processor may be configured to implement or execute the methods, steps, and logical block diagrams disclosed in some embodiments of this application. The steps of the method disclosed in conjunction with some embodiments of this application may be directly embodied as executed by a hardware decoding processor, or executed by a combination of hardware and software modules in the decoding processor. The software module may be located in random access memory, flash memory, read-only memory, programmable read-only memory or erasable programmable memory, registers and other storage medium known in the art. The storage medium is located in the memory, and the processor reads the information in the memory, and completes the steps of the above method in combination with its hardware.

The memory mentioned above includes but is not limited to:

volatile memory and/or non-volatile memory. Herein, the non-volatile memory may include a Read-Only Memory (ROM), a Programmable ROM (PROM), an Erasable PROM (EPROM), an Electrically EPROM (EEPROM) or flash memory; the volatile memory may include Random Access Memory (RAM), which acts as an external cache. By way of example, but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), synch link DRAM (SLDRAM) and Direct Rambus RAM (DR RAM).

It should be noted that the memory described herein is intended to include these and any other suitable types of memory.

Embodiments of this application also provide a computer-readable storage medium for storing a computer program. The computer-readable storage medium stores one or more programs including instructions that, when executed by a portable electronic device including a plurality of application programs, enable the portable electronic device to perform the methods according to some method embodiments. Optionally, the computer-readable storage medium can be applied to the mobile terminal/terminal device according to some embodiments of this application, and the computer program enables the computer to execute the corresponding processes implemented by the mobile terminal/terminal device in each method according to some embodiments of this application, which are not repeated here for brevity.

Some embodiments of this application also provide a computer program product, including a computer program. Optionally, the computer program product can be applied to the mobile terminal/terminal device according to some embodiments of this application, and the computer program enables a computer to execute the corresponding processes implemented by the mobile terminal/terminal device in each method according to some embodiments of this application, which are not repeated here for brevity.

A computer program is also provided according to some embodiments of this application. When the computer program is executed by a computer, it enables the computer to perform the method according to some method embodiments. Optionally, the computer program can be applied to the mobile terminal/terminal device according to some embodiments of this application, and when the computer program runs on the computer, the computer program is implemented by the mobile terminal/terminal device in each method according to some embodiments of this application, which are not repeated here for brevity.

In addition, some embodiments of this application also provides a communication system, the communication system may include the forgoing terminal device and network device to form a communication system as shown in FIG. 1, which is not repeated here for brevity. It should be noted that the terms "system" and the like in this document may also be referred to as "network management architecture" or "network system" and the like.

It should also be understood that the terms used in some embodiments of this application and the appended claims are only for the purpose of describing specific embodiments, and are not intended to limit some embodiments of this application. For example, as used in some embodiments of this application and the appended claims, the singular forms "a," "the," "above," and "the" are intended to include the plural forms as well, unless the context clearly dictates otherwise.

Those skilled in the art can realize that the units and algorithm steps of each example described in conjunction with some embodiments disclosed herein can be implemented in electronic hardware, or a combination of computer software and electronic hardware. Whether these functions are performed in hardware or software depends on the specific application and design constraints of the technical solution. Experts may use different manners for each specific application to implement the described functions, but such implementation should not be considered beyond the scope according to the embodiments of this application.

If implemented in the form of a software functional unit and sold or used as a stand-alone product, it may be stored in a computer-readable storage medium. Based on this understanding, the technical solutions according to some embodiments of this application in essence, or the parts thereof that make contributions to the prior art, or the parts of the technical solution can be embodied in the form of software products, which are stored in a storage medium, including several instructions for causing a computer device (e.g., a personal computer, a server, a network device, or the like) to execute all or part of the steps of the methods described in some embodiments of this application. The aforementioned storage medium includes a U disk, a removable hard disk, a read-only memory, a random access memory, a magnetic disk or an optical disk and other medium that can store program codes.

Those skilled in the art can clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed systems, devices and methods may be implemented in other manners. For example, the division of units, modules or components in the device embodiments described above is only a logical function division, and other division manners may be used in actual implementation. For example, multiple units, modules or components may be combined or integrated to another system, or some units or modules or components can be ignored or may not be implemented. For another example, the forgoing units/modules/components described as separate/display components may or may not be physically separated, that is, may be located in one place, or may be distributed to multiple network units. Some or all of the units/modules/components may be selected according to actual needs to achieve the purpose according to some embodiments of this application.

The above contents are only specific implementations according to some embodiments of this application, but the protection scope according to some embodiments of this application is not limited thereto. Changes or substitutions, that are easily conceived by those skilled in the art in light of technical scope disclosed in the embodiments of this application, should all be covered within the protection scope according to some embodiments of this application. Therefore, the protection scope according to some embodiments of this application should be subject to the protection scope of the claims.

What is claimed is:

1. A wireless communication method, comprising:
monitoring a control channel candidate based on at least one of a first offset value, a second offset value, or a hybrid automatic repeat request acknowledgement (HARQ-ACK) feedback state;
wherein, a time interval corresponding to the first offset value is associated with a timing advance (TA) value or a round-trip time (RTT) of a terminal device, and a time interval corresponding to the second offset value is associated with synchronization information acquisition of the terminal device.

2. The method according to claim 1, wherein the first offset value is configured to determine a scheduling timing between an uplink grant and a physical uplink shared channel (PUSCH); and/or, the first offset value is configured to determine a scheduling timing between a physical downlink shared channel (PDSCH) and an HARQ-ACK feedback.

3. The method according to claim 1, wherein the first offset value is predefined; or,
the first offset value is configured by a network device through at least one of a system message, radio resource control (RRC), a medium access control (MAC) control element (CE), or downlink control information (DCI).

4. The method according to claim 1, wherein a unit of the first offset value is a time unit or an absolute value.

5. The method according to claim 1, wherein the second offset value is configured to determine a scheduling timing between a downlink grant and a PDSCH.

6. The method according to claim 1, wherein the second offset value is predefined; or,
the second offset value is configured by a network device through at least one of a system message, RRC, a MAC CE, or DCI.

7. The method according to claim 1, wherein a unit of the second offset value is a time unit or an absolute value.

8. The method according to claim 1, wherein the HARQ-ACK feedback state comprises that HARQ-ACK feedback of PDSCH is disabled; or the HARQ-ACK feedback state comprises that HARQ-ACK corresponding to PDSCH is in a non-feedback state.

9. The method according to claim 8, wherein if a first HARQ process is configured with disabling of HARQ-ACK feedback, the HARQ-ACK feedback corresponding to a PDSCH transmitted by using the first HARQ process is not performed.

10. The method according to claim 1, wherein monitoring the control channel candidate based on at least one of the first offset value, the second offset value, or the HARQ-ACK feedback state comprises:
determining, based on the first offset value, whether to monitor the control channel candidate in a time unit between an uplink grant and an uplink shared channel;
determining, based on the first offset value, whether to monitor the control channel candidate in a time unit between a physical downlink control channel (PDCCH) order and a random access channel;
determining, based on the first offset value, whether to monitor the control channel candidate in a time unit after transmission of an uplink shared channel or an uplink control channel;
determining, based on the first offset value, whether to monitor the control channel candidate in a time unit after transmission of a random access channel;
determining, based on the first offset value, whether to monitor the control channel candidate in a time unit between a downlink grant and an HARQ-ACK feedback corresponding to a downlink shared channel;
determining, based on the first offset value and the second offset value, whether to monitor the control channel candidate in a time unit between a downlink grant and an HARQ-ACK feedback corresponding to a downlink shared channel;
determining, based on the second offset value, whether to monitor the control channel candidate in a time unit between a downlink grant and a downlink shared channel.

11. A terminal device, comprising:
a processor and a memory, wherein the memory is configured to store a computer program, which when executed by the processor, causes the processor to be configured to monitor a control channel candidate based on at least one of a first offset value, a second offset value, or a hybrid automatic repeat request acknowledgement (HARQ-ACK) feedback state;

wherein, a time interval corresponding to the first offset value is associated with a timing advance (TA) value or a round-trip time (RTT) of the terminal device, and a time interval corresponding to the second offset value is associated with synchronization information acquisition of the terminal device.

12. The terminal device according to claim 11, wherein the first offset value is configured to determine a scheduling timing between an uplink grant and a physical uplink shared channel (PUSCH); and/or, the first offset value is configured to determine a scheduling timing between a physical downlink shared channel (PDSCH) and an HARQ-ACK feedback.

13. The terminal device according to claim 11, wherein the first offset value is predefined; or, the first offset value is configured by a network device through at least one of a system message, radio resource control (RRC), a medium access control (MAC) control element (CE), or downlink control information (DCI).

14. The terminal device according to claim 11, wherein a unit of the first offset value is a time unit or an absolute value.

15. The terminal device according to claim 11, wherein the second offset value is configured to determine a scheduling timing between a downlink grant and a PDSCH.

16. The terminal device according to claim 11, wherein the second offset value is predefined; or, the second offset value is configured by a network device through at least one of a system message, RRC, a MAC CE, or DCI.

17. The terminal device according to claim 11, wherein the processor is further configured to:

if a first HARQ process corresponds to an HARQ-ACK feedback disabled state, and an end position of a first downlink shared channel corresponding to the first HARQ process received by the terminal device is in a time unit n, the terminal device does not expect to monitor the control channel candidate in time units from a time unit n+1 to a time unit n+k, where k is a non-negative integer.

18. The terminal device according to claim 17, wherein the processor is further configured to:

if the first HARQ process corresponds to the HARQ-ACK feedback disabled state, and the end position of the first downlink shared channel corresponding to the first HARQ process received by the terminal device is in the subframe n, the terminal device does not expect to monitor the control channel candidate in any subframe ranging from the subframe n+1 to the subframe n+12.

19. The terminal device according to claim 11, wherein the processor is further configured to:

determine, based on the first offset value, whether to monitor the control channel candidate in a time unit between an uplink grant and an uplink shared channel;

determine, based on the first offset value, whether to monitor the control channel candidate in a time unit between a physical downlink control channel (PDCCH) order and a random access channel;

determine, based on the first offset value, whether to monitor the control channel candidate in a time unit after transmission of an uplink shared channel or an uplink control channel;

determine, based on the first offset value, whether to monitor the control channel candidate in a time unit after transmission of a random access channel;

determine, based on the first offset value, whether to monitor the control channel candidate in a time unit between a downlink grant and an HARQ-ACK feedback corresponding to a downlink shared channel;

determine, based on the first offset value and the second offset value, whether to monitor the control channel candidate in a time unit between a downlink grant and an HARQ-ACK feedback corresponding to a downlink shared channel;

determine, based on the second offset value, whether to monitor the control channel candidate in a time unit between a downlink grant and a downlink shared channel.

20. A non-transitory computer-readable storage medium storing a computer program, which when executed by a computer, causes the computer to implement operations comprising:

monitoring a control channel candidate based on at least one of a first offset value, a second offset value, or a hybrid automatic repeat request acknowledgement (HARQ-ACK) feedback state; wherein, a time interval corresponding to the first offset value is associated with a timing advance (TA) value or a round-trip time (RTT) of a terminal device, and a time interval corresponding to the second offset value is associated with synchronization information acquisition of the terminal device.

* * * * *